July 13, 1926.

A. E. BREWERTON 1,592,553

APPARATUS FOR INDICATING COMPONENTS OF MOVEMENTS

Filed August 20, 1918  3 Sheets-Sheet 1

INVENTOR
Arthur E. Brewerton
BY Herbert H. Thompson
his ATTORNEY

July 13, 1926.

A. E. BREWERTON 1,592,553

APPARATUS FOR INDICATING COMPONENTS OF MOVEMENTS

Filed August 20, 1918    3 Sheets-Sheet 3

INVENTOR
Arthur E. Brewerton.
BY Herbert H. Thompson
his ATTORNEY

Patented July 13, 1926.

1,592,553

UNITED STATES PATENT OFFICE.

ARTHUR ERNEST BREWERTON, OF ACTON, LONDON, ENGLAND.

APPARATUS FOR INDICATING COMPONENTS OF MOVEMENTS.

Application filed August 20, 1918, Serial No. 250,746, and in Great Britain August 21, 1917.

This invention relates to apparatus for indicating components of movements and more particularly to apparatus for resolving the movement of say a vehicle into rectangular components and intergrating each of the components.

The invention is particularly applicable to the construction of apparatus for resolving the movement or course of a ship into cardinal components, and indicating the same upon numerical counters or other indicating or recording devices, separate counters or the like being used for each rectangular component of the course so that at any time the vessel's position relatively to any previous position may be ascertained by the dead reckoning data supplied by the counters or the like, neglecting of course the effect of wind and current.

According to this invention, each of the counters or recording mechanisms is operated by a disc or wheel which is rotated by a pawl mechanism or the like reciprocated at a rate depending on the speed of the ship, the effective movements of the pawl mechanism depending on the magnitude of the particular component of the direction of movement so that the movement registered is dependent on the component of the speed.

The reciprocation of the pawl mechanism or the like at a rate proportional to the speed of the vessel may be effected either mechanically or electrically, preferably the latter, in any suitable way.

In order that the invention may be clearly understood and readily carried into effect the same will now be more fully described with reference to the accompanying drawings which illustrate by way of example embodiments of the invention and in which:—

Figure 1:
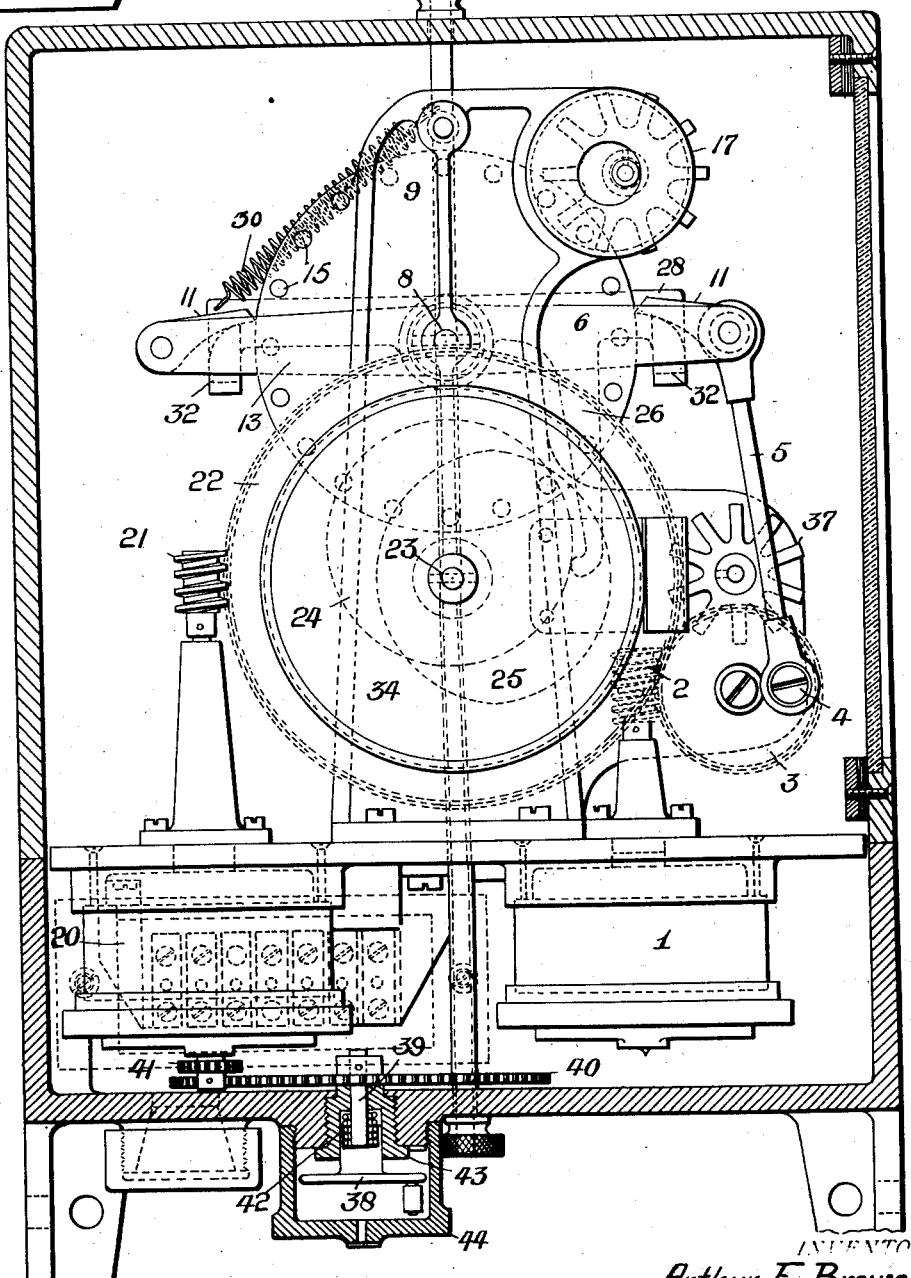
Figure 1 is a side view of one form of the instrument with the side of the casing removed.
Figure 2:
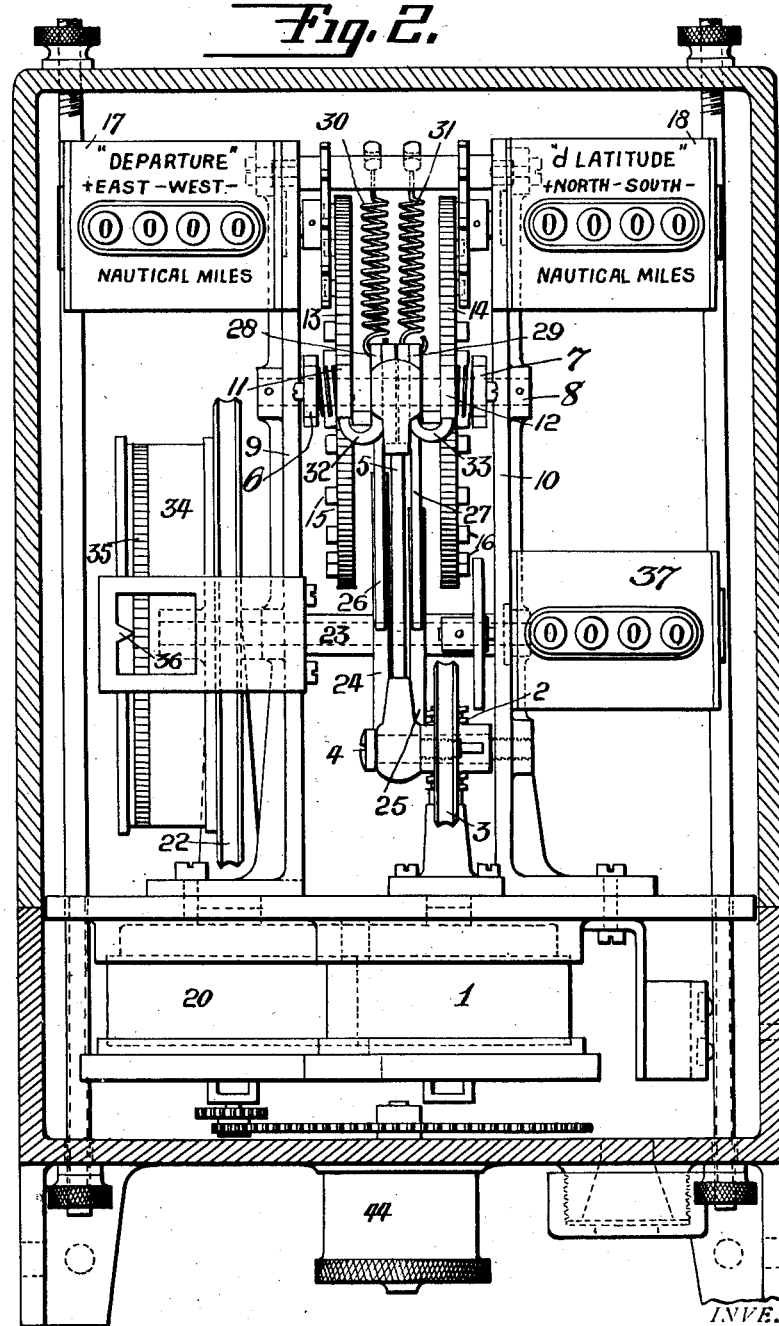
Figure 2 is a front view of the same.

Referring to Figures 1 and 2, the instrument comprises an electric motor 1 which will be termed the "log motor" and which is operated either from a log driven transmitter or from a similar device driven by the engine shafting by the step-by-step method in any suitable way. Preferably a step-by-step motor is employed which is driven by a three contact continuous current transmitter operated by the ship's log or the engine shaft. The spindle of the log motor is provided with a worm 2 engaging a worm wheel 3 on which is fitted a crank pin 4. Journalled on the crank pin 4 is one end of a connecting rod 5 the other end of which is journalled on a rocking frame formed of two bars 6 and 7 mounted on a spindle 8 carried by standards 9 and 10. Pivoted on the ends of the bars 6 and 7 are pawls 11, 11 and 12, 12. Mounted on the spindle 8 are two integrating wheels 13 and 14 having ratchet teeth on their peripheries which teeth are adapted to be engaged by the pawls 11, 11 and 12, 12. Pins 15 and 16 on the integrating wheels 13 and 14 serve to operate counters 17 and 18 for indicating the rectangular components of the movement of the vessel—that is to say—"departure" and "d latitude," as hereinafter described.

A second motor 20, which will be termed the "compass motor," is operated by a gyro compass transmitter or a similar device. The spindle of the compass motor is fitted with a worm 21 which meshes with a worm wheel 22 carried on a spindle 23 having bearings in the standards 9 and 10. Fixed to the spindle 23 so as to rotate with the worm wheel 22 are two cams 24 and 25 these cams being of similar shape and eccentricity but having their eccentricities at right angles to each other. Arms 26 and 27 bear respectively on the two cams these arms being dependent from bars 28 and 29 which can rock about the spindle 8, the arms being kept in contact with the cams by springs 30 and 31 connected at their lower ends to the bars 28 and 29. The ends of extensions 32, 32 and 33, 33 from the ends of the bars 28 and 29 are adapted to bear on the pawls 11, 11 and 12, 12 carried by the bars 6 and 7. The bars 28 and 29 with their extensions 26, 27 and 32, 32 and 33, 33 form together what will hereinafter be referred to as "guard frames."

The operation of the mechanism as thus far described is as follows:—

The log motor which runs at a speed proportional to the speed of the vessel reciprocates through the connecting rod 5 the pawl frame consisting of the bars 6 and 7. The compass motor sets the cams 24 and 25 in position according to the course of the vessel thereby moving the guard frames carrying the extensions 32, 32 and 33, 33 which are engaged by the pawls. With a guard frame in a mean position the reciprocation of the associated pawls only causes the associated integrating wheel to oscillate but for any other position of the guard frame the said integrating wheel receives an impulse in one direction of a greater magnitude than that in the other and the integrating wheel is thereby caused slowly to rotate in one or the other direction according to whether the movement is a positive or negative one. Thus, in a meridianal course the northerly course may be termed positive and the southerly course negative and similarly an easterly course may be termed positive and a westerly course negative. The rotations of the integrating wheels are transmitted to the counters 17 and 18 as hereinbefore described which counters consequently indicate the components of the movement of the vessel. In order to prevent the pawls in their return movements operating by friction the integrating wheels, a friction device or brake may be applied to the integrating wheels against which the pawls operate in either direction.

It is obvious that other well known mechanical equivalents of the pawls and ratchets may be made use of if desired.

Preferably there is provided on the cam spindle 23 a compass card or dial with a lubber's line for indicating the course of the vessel to which the cams are set. This may consist of a cylinder 34 on which the degrees of the course are indicated on the scale 35 as shewn in Figure 2, the lubber's line being marked by the point 36.

A counter 37 operated by the worm wheel 3 may be provided to integrate the total distance traversed in the direction of the course.

Means are provided for setting the directional portion of the instrument into agreement with the master compass by well known synchronizing methods, the stop contact and locking devices being carried so as to move integrally respectively with the azimuth dial and the compass motor armature.

Mechanism for the manual setting of the instrument into agreement with the course is also provided. This mechanism comprises a crank disk and handle 38 slidably but nonrotatably mounted on the spindle 39. The spindle 39 carries a gear wheel 40 which can be pushed into engagement with the pinion 41 on the spindle of the compass motor but is normally withheld therefrom by the spring 42 contained within the spring case or boss 43. The crank disk is protected by a removable cap 44 after removal of which the disk is pressed inwards to engage the gears 40 and 41 and then rotated until the scale 35 reading against the lubber's line 36 agrees with the master compass.

Means may be similarly provided for setting the counters to zero or to any desired values of "d latitude" and "departure" corresponding to the vessel's position.

Figure 3:
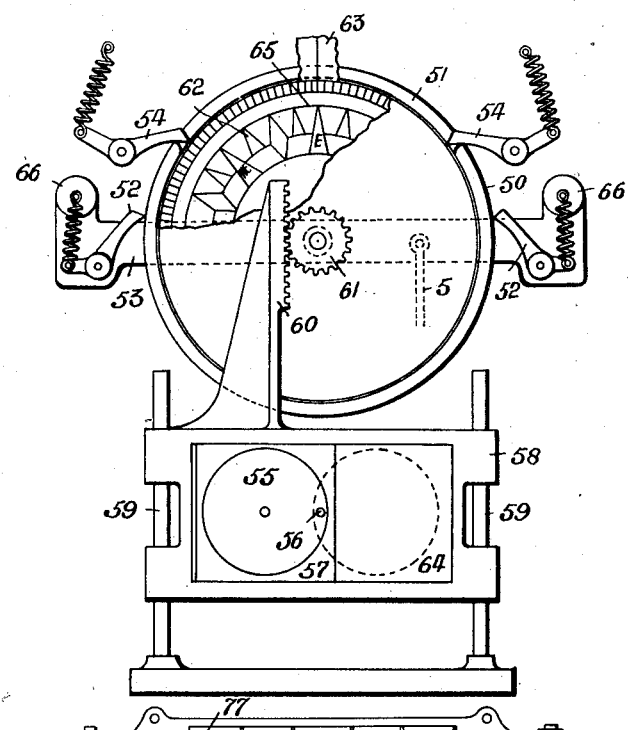
Figure 3 illustrates another form of the instrument.

In the construction of the instrument shown in Figure 3 there is employed a modified arrangement for operating the integrating wheels (only one of which is shown). In place of the guard frames of the type shown in Figures 1 and 2, a cylindrical guard 50 is provided having an opening or cut away section 51 of such dimensions that in the neutral position neither of the pawls 52, 52 carried on a pawl frame 53 operates on the wheel. When, however, the component translating mechanism rotates the cylindrical guard through the angle corresponding to a 90° change of course, one of the pawls engages with the integrating wheel during the whole period of the movement of the pawl frame 53 and a maximum value of integration is then recorded. The guard frames may be operated by cams the cams being so shaped that for all intermediate values of components, proportionate engagement of the pawls with the integrating wheels will occur. The guard frames may however be operated as shown and as hereinafter described.

An alternative method to the friction device or brake hereinbefore referred to for holding the integrating wheels is also shown in Figure 3 in which a pair of pawls 54 are shown fixed relatively to the frame of the instrument. These are arranged and adjusted so that they engage in opposite directions and both engage when the guard frame is in the neutral position. Preferably these pawls should operate on a different portion of the toothed periphery of the wheel so that the rocking pawls 52, 52 may approach to a condition of parallelism in the extreme positions of their oscillations. The guard however, is arranged to cover the entire width so as to control both pawls. In this way both the rocking and fixed pawls are affected by the slightest movement from the mean position of the guard frame which immediately releases a fixed pawl on one side of the guard and allows the opposite rocking pawl to effect rotational engagement partly by the aforesaid release and partly by exposing the wheel to the action of the rocking pawl frame.

Figure 3 also shows an alternative method of component translation consisting of an eccentric or crank pin 55 rotatable about the centre 56 and surrounded by the slidable plate or block 57 which in turn moves in the frame 58, the latter moving at right angles on rods 59 attached to the frame or base of the instrument. Attached to the frame 58 is a rack 60 engaging a pinion 61 mounted so as to move with the guard frame 50, the combination forming a true harmonic translator for moving the guard frame through angles strictly proportional to one rectangular component of the rotation of the eccentric 55 about the centre 56.

An alternative form of compass dial is also shown at 62 in Figure 3 and a lubber's line 63 fixed to the frame of the instrument indicates the particular course being translated.

Means for balancing the moving parts of the instrument may be provided as for instance a counterweight 64 may be provided to correct the balance of the rack and movable parts 55, 57 and 58. In a similar manner weights 66 and 66 correct the pendular effect respectively of the guard frame 50 and the pawl frame 53.

Figure 4:
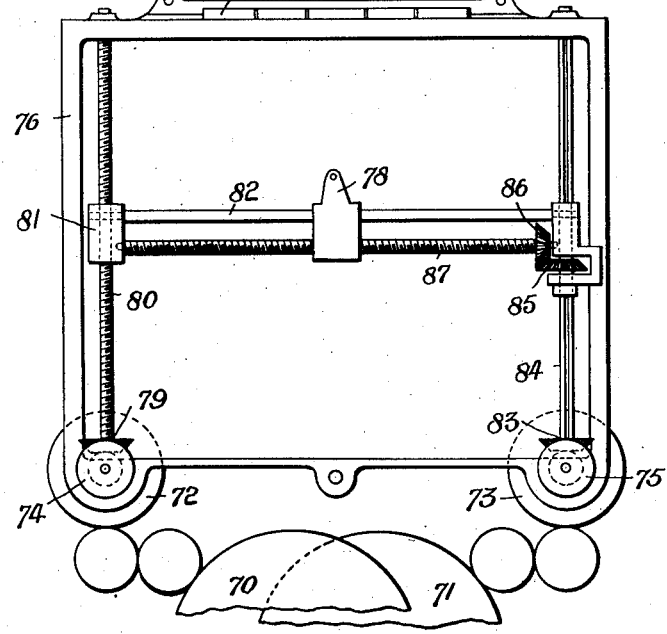
Figure 4 shows mechanism which may be employed for giving a graphic record of the readings of the instruments.

Means for utilizing the invention for moving a pencil carriage or other recording means over a chart or its equivalent is shown in Figure 4 in which the integrating wheels are shown separately at 70 and 71. The integrating wheels are geared respectively through intermediate wheels to wheels 72 and 73 on the spindles of which bevelled wheels 74 and 75 are mounted. The wheels 72, 73, 74 and 75 are carried in a frame 76 hinged at 77 so that it may be lifted for the replacement of paper under the pencil carriage 78 when required. One of the aforesaid bevelled wheels 74 intermeshes with bevel wheel 79 mounted on the end of screw 80 carrying the block 81 to which the frame 82 on which the pencil carriage 78 traverses, is attached. Rotation of the integrating wheel 70 in one direction or the other therefore moves the pencil carriage in the north-south direction over the paper. Similarly the bevelled wheel 83 on the other side of the frame is mounted on a shaft 84 provided with a groove into which a key of the wheel 85 engages. Rotation of the wheel 73 accordingly rotates wheels 85 and 86, the latter being attached to a screwed shaft 87 engaging with the pencil carriage 78. Movement of the integrating wheel 71 accordingly operates the pencil carriage in an east west direction. For the north south movement a duplicate screw threaded shaft on the opposite side to the one shown at 80 may be provided, the two shafts being coupled together by intermediate wheels. It will therefore be obvious that by arranging a suitable ratio of wheels between the integrating wheels and the screwed shafts, the path of the vessel will be traced on the chart to a suitable scale and the position of the vessel at any moment can be ascertained relatively to its starting position.

What I claim and desire to secure by Letters Patent of the United States is:—

1. In a course and distance recorder, a driven member, indicating means controlled thereby, a driving member for actuating said driven member intermittently whenever said driving member is actuated, speed responsive means for actuating said driving member and compass-controlled means for controlling the time of actuation of said driven member by said driving member.

2. An instrument for resolving the distance traveled by an object into its component in a given direction, said instrument comprising a driven element, a plurality of driving members continuously actuated when said object is in motion and engageable with said driven element for actuating the latter in opposite directions whenever said object is moving at an angle, other than a right angle, with respect to said given direction, and means positioned in accordance with a function of the last mentioned angle for causing the action of either of said driving members to predominate.

3. In combination, a shaft, a ratchet wheel, a plurality of pawls for actuating said wheel in opposite directions, means for driving said pawls from said shaft whenever the latter is rotated, means for causing one of said pawls to engage said ratchet wheel for a longer time than another of said pawls engages said wheel and indicating means operatively connected to said ratchet wheel.

4. A navigation instrument adapted to be used on a ship, said instrument comprising a ratchet wheel, a pawl adapted to engage said ratchet wheel, speed responsive means for reciprocating said pawl and compass-controlled means for rendering more or less of the stroke of said pawl idle in accordance with the heading of the ship.

5. In combination, dual means for indicating the components of the distance traveled by an object in two directions at right angles to one another, means actuated in accordance with the speed of said object for positively driving both of said first named means, means for changing the connections between said first and second named means in accordance with functions of the angles between the instantaneous heading of the object and said two directions, and means operatively connected to said indicating means for recording the course of the object.

6. In combination a member mounted for rotation about an axis, distance means for causing said member to oscillate about said axis, compass controlled means for varying the amplitude of the opposite oscillatory movements of said member and indicating means controlled by said member.

ARTHUR ERNEST BREWERTON.